US010018133B2

(12) United States Patent
Leone

(10) Patent No.: US 10,018,133 B2
(45) Date of Patent: Jul. 10, 2018

(54) SYSTEM AND METHOD TO EXTEND OPERATING TIME OF VALVE ACTUATORS OF AN INTERNAL COMBUSTION ENGINE

(71) Applicant: Ford Global Technologies, LLC, Dearborn, MI (US)

(72) Inventor: Thomas G. Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 131 days.

(21) Appl. No.: 15/272,999

(22) Filed: Sep. 22, 2016

(65) Prior Publication Data
US 2018/0080398 A1   Mar. 22, 2018

(51) Int. Cl.
*F02D 41/00* (2006.01)
*F02D 13/06* (2006.01)
*F02P 5/15* (2006.01)
*F02D 17/02* (2006.01)
*F01L 13/00* (2006.01)

(52) U.S. Cl.
CPC ...... *F02D 41/0087* (2013.01); *F01L 13/0005* (2013.01); *F02D 13/06* (2013.01); *F02D 17/02* (2013.01); *F02P 5/1512* (2013.01); *F02D 2041/001* (2013.01); *F02D 2041/0012* (2013.01); *F02D 2200/021* (2013.01); *F02D 2200/101* (2013.01); *F02D 2200/1002* (2013.01)

(58) Field of Classification Search
CPC ...... F02D 41/0087; F02D 17/02; F02D 13/06; F02D 2041/0012; F02D 2041/001; F02P 5/1512; F01L 13/0005
See application file for complete search history.

(56) References Cited

U.S. PATENT DOCUMENTS

| 7,204,132 B2* | 4/2007 | Reed ......................... F01L 9/04 73/114.73 |
| 9,086,024 B2 | 7/2015 | Tripathi et al. |
| 2016/0003168 A1 | 1/2016 | Leone et al. |
| 2016/0003169 A1 | 1/2016 | Leone et al. |
| 2016/0024981 A1 | 1/2016 | Parsels et al. |
| 2016/0116371 A1 | 4/2016 | Chen et al. |

OTHER PUBLICATIONS

Wilcutts, Mark, et al., "Design and Benefits of Dynamic Skip Fire Strategies for Cylinder Deactivated Engines," SAE International Journal Engines vol. 6, 2013, Technical Paper 2013-01-0359, 11 pages.

Serrano, Joe, et al., "Methods of Evaluating and Mitigating NVH When Operating an Engine in Dynamic Skip Fire," SAE International Journal Engines vol. 7, Issue 3, 2014, Technical Paper 2014-01-1675, 13 pages.

Elisazadeh-Far, K, et al., "Fuel Economy Gains Through Dynamic Skip-Fire in Spark Ignition Engines," SAE Technical Paper 2016-01-0672, Published Apr. 5, 2016, 9 pages.

* cited by examiner

Primary Examiner — Mark Laurenzi
Assistant Examiner — Wesley Harris
(74) Attorney, Agent, or Firm — Julia Voutyras; McCoy Russell LLP

(57) ABSTRACT

Systems and methods for determining when one or more cylinders of an engine may be deactivated are presented. In one example, different cylinder deactivation strategies are used to determine which engine cylinders are deactivated during an engine cycle in response to an actual total number of valve actuator state changes being greater than a first threshold.

20 Claims, 6 Drawing Sheets

SYSTEM AND METHOD TO EXTEND OPERATING TIME OF VALVE ACTUATORS OF AN INTERNAL COMBUSTION ENGINE

FIELD

The present description relates to a system and methods for selectively activating and deactivating cylinders of an engine to conserve fuel while meeting engine torque demands. The system and methods vary which cylinders of an engine fire from one engine cycle to the next engine cycle.

BACKGROUND AND SUMMARY

An engine may include a plurality of variable valve actuators that allow one or more engine cylinders to be activated or deactivated between engine cycles. In some engines, the engine cylinders that are deactivated may vary each engine cycle so that each engine cylinder is deactivated a same number of times as other cylinders of the engine over a plurality of engine cycles. By deactivating engine cylinders in this way, engine pumping losses may be reduced and operating conditions of engine cylinders may be more uniform. However, over the course of operating the engine over a significant amount of time and driving distance, the engine valve actuators may change state so many times that they degrade, thereby making engine cylinder deactivation less reliable. This may be especially true for engines that switch which engine cylinders are deactivated each engine cycle or each engine event since each valve actuator of each engine cylinder may be repeatedly switched from operating a valve to not operating the valve even when engine load is constant.

The inventor herein has recognized the above-mentioned issues and has developed an engine control method, comprising: deactivating engine cylinders via a controller according to a first cylinder deactivation strategy in response to an actual total number of valve actuator state changes being less than a first threshold; and deactivating the engine cylinders via the controller according to a second cylinder deactivation strategy in response to an actual total number of valve actuator state changes being greater than a second threshold.

By changing between two or more cylinder deactivation strategies in response to an actual total number of valve actuator state changes, it may be possible to provide the technical result of extending an operating time of engine valve actuators. In particular, valve actuators may have a finite number of state changes which they are expected to operate with a low probability of degradation. If the valve actuators continue to change state at a same rate after the finite number of state changes, the possibility of valve actuator degradation may increase. Nevertheless, the rate at which valve actuators change state may be reduced by deactivating fixed groups of cylinders instead of rotating or varying which cylinders are deactivated each engine cycle. The rate at which a valve actuator changes state may be reduced when cylinders are deactivated in fixed groups because valve actuators do not have to change state each engine cycle as compared to strategies where valve actuators can change state each engine cycle. Therefore, a second valve strategy where cylinders are deactivated in a fixed group may be substituted or combined with a first strategy where cylinders are deactivated on a rotating basis (e.g., in a first engine cycle, engine cylinder number one may be deactivated while engine cylinders two, three, and four are active; in a second engine cycle immediately following the first engine cycle, engine cylinder number two may be deactivated while engine cylinders one, three, and four are active; in a third engine cycle immediately following the second engine cycle, engine cylinder number three may be deactivated while engine cylinders one, two, and four are active, and so on) to reduce valve actuator state changes, thereby extending valve actuator operating time.

The present description may provide several advantages. In particular, the approach may increase an amount of time a valve actuator may operate without degradation. Further, the approach provides progressive actions that act to extend valve actuator usefulness while still enabling cylinder deactivation. In addition, the approach may deactivate cylinder deactivation so that cylinder operation may be maintained even though a valve actuator is approaching conditions where valve actuator degradation is expected.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
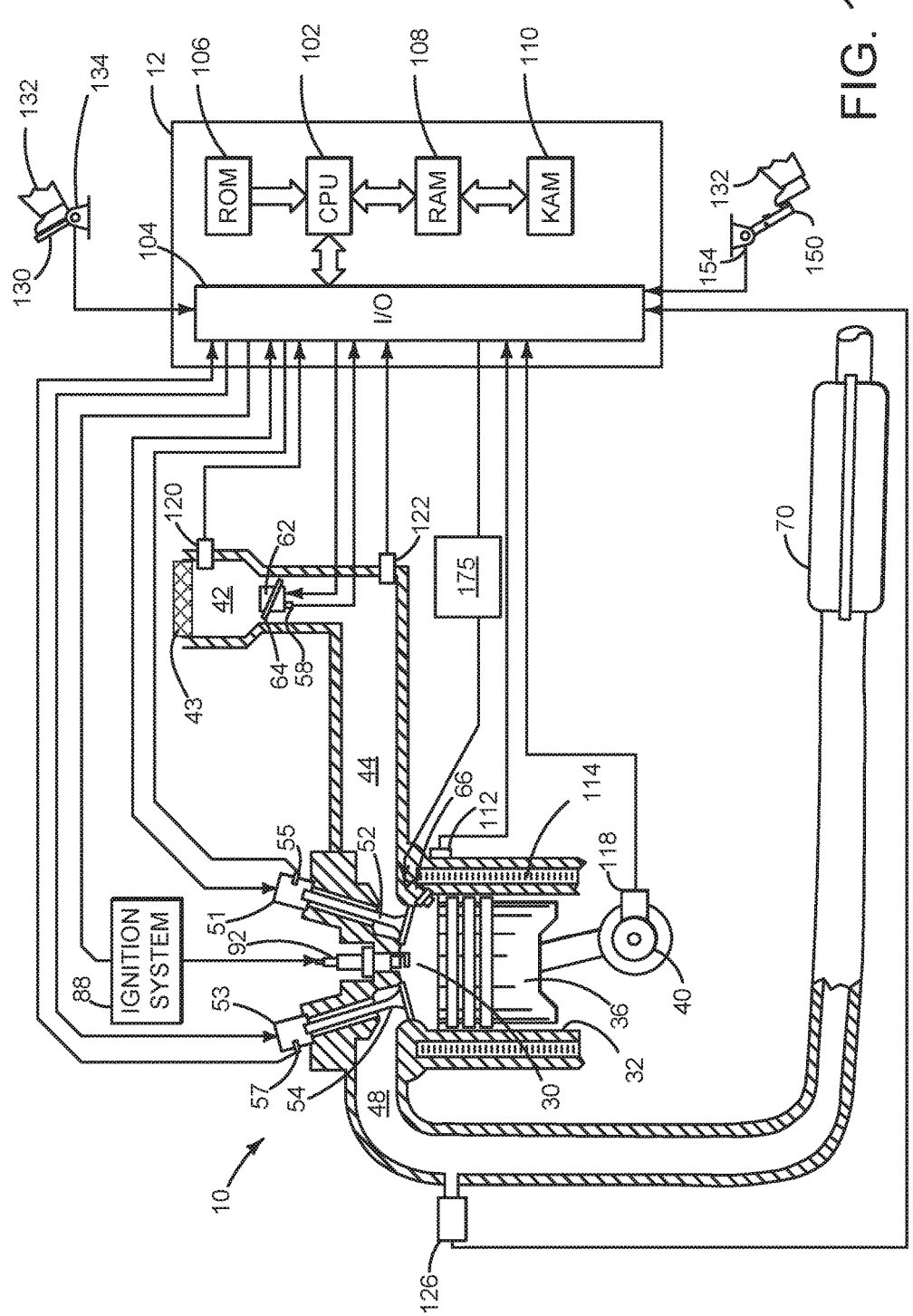
FIG. 1 is a schematic diagram of an engine.

The present description is related to extending operating time of engine cylinder valve actuators. The valve actuator may be included in an engine as shown in FIGS. 1-2B. The engine may be operated via a controller according to the sequences shown in FIGS. 3A and 3B. The engine cylinder valve actuators may be controlled based on the engine operating ranges shown in FIGS. 4A and 4B. A method for operating the engine of FIGS. 1-2B to provide extended operating time is shown in FIG. 5.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40.

Combustion chamber 30 is shown communicating with intake manifold 44 and exhaust manifold 48 via respective intake valve 52 and exhaust valve 54. Each intake and exhaust valve may be operated by a variable intake valve actuator 51 and a variable exhaust valve actuator 53, which may be actuated mechanically, electrically, hydraulically, pneumatically, or by a combination of the same. For example, the valve actuators may be of the type described in U.S. Patent Publication 2014/0303873 and U.S. Pat. Nos. 6,321,704; 6,273,039; and 7,458,345, which are hereby fully incorporated for all intents and purposes. Intake valve actuator 51 and an exhaust valve actuator may open intake 52 and exhaust 54 valves synchronously or asynchronously with crankshaft 40. The position of intake valve 52 may be determined by intake valve position sensor 55. The position of exhaust valve 54 may be determined by exhaust valve position sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system 175. In addition, intake manifold 44 is shown communicating with optional electronic throttle 62 (e.g., a butterfly valve) which adjusts a position of throttle plate 64 to control air flow from air filter 43 and air intake 42 to intake manifold 44. Throttle 62 regulates air flow from air filter 43 in engine air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; brake pedal position from brake pedal position sensor 154 when human driver 132 applies brake pedal 150; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2A:
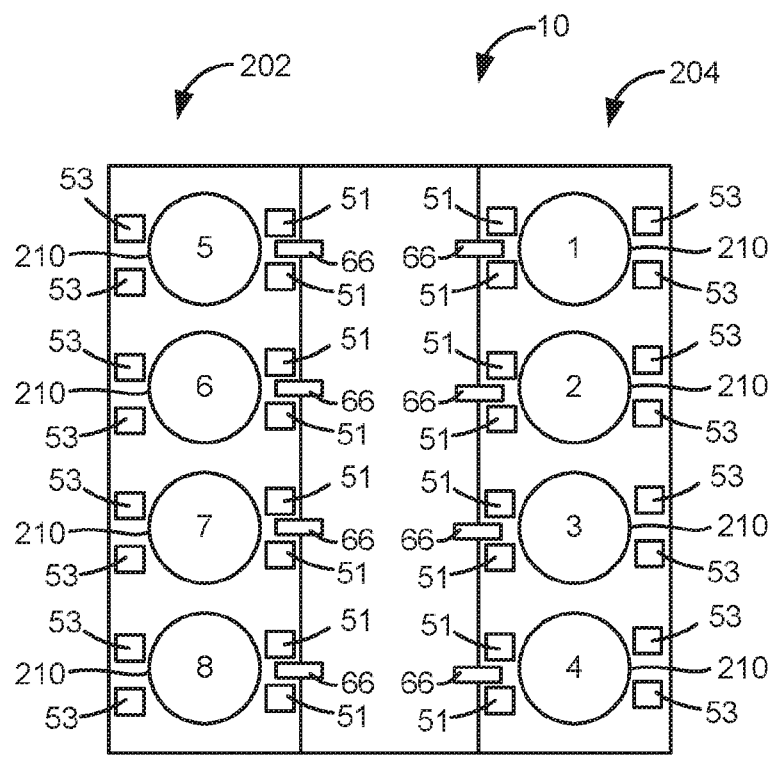
FIG. 2A is a schematic diagram of an eight cylinder engine with two cylinder banks.
Figure 2B:
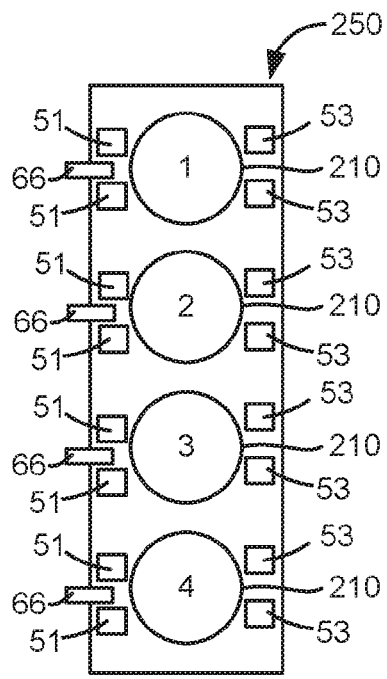
FIG. 2B is a schematic diagram of a four cylinder engine with a single cylinder bank.

Referring now to FIG. 2A, an example multi-cylinder engine that includes two cylinder banks is shown. The engine includes cylinders and associated components as shown in FIG. 1. Engine 10 includes eight cylinders 210. Each of the eight cylinders is numbered and the numbers of the cylinders are included within the cylinders. Fuel injectors 66 selectively supply fuel to each of the cylinders that are activated (e.g., combusting fuel during a cycle of the engine). Cylinders 1-8 may be selectively deactivated to improve engine fuel economy when less than the engine's full torque capacity is requested. For example, cylinders 2, 3, 5, and 8 (e.g., a fixed pattern of deactivated cylinders) may be deactivated during an engine cycle (e.g., two revolutions for a four stroke engine) and may be deactivated for a plurality of engine cycles while engine speed and load are constant or vary slightly. During a different engine cycle, a second fixed pattern of cylinders 1, 4, 6, and 7 may be deactivated. Further, other patterns of cylinders may be selectively deactivated based on vehicle operating conditions. Additionally, engine cylinders may be deactivated such that a fixed pattern of cylinders is not deactivated over a plurality of engine cycles. Rather, cylinders that are deactivated may change from one engine cycle to the next engine cycle. Each cylinder includes variable intake valve actuators 51 and variable exhaust valve actuators 53. An engine cylinder may be deactivated by its variable intake valve actuators 51 and variable exhaust valve actuators holding intake and exhaust valves of the cylinder closed during an entire cycle of the cylinder, while fuel injector 66 does not inject fuel to the cylinder during an entire cycle of the cylinder. An engine cylinder may be activated by its variable intake valve actuators 51 and variable exhaust valve actuators 53 opening and closing intake and exhaust valves of the cylinder during a cycle of the cylinder, while fuel injector 66 injects fuel to the cylinder during a cycle of the cylinder. Engine 10 includes a first cylinder bank 204, which includes four cylinders 1, 2, 3, and 4. Engine 10 also includes a second cylinder bank 202, which includes four cylinders 5, 6, 7, and 8. Cylinders of each bank may be active or deactivated during a cycle of the engine.

Referring now to FIG. 2B, an example multi-cylinder engine that includes one cylinder banks is shown. The engine includes cylinders and associated components as shown in FIG. 1. Engine 10 includes four cylinders 210. Each of the four cylinders is numbered and the numbers of the cylinders are included within the cylinders. Fuel injectors 66 selectively supply fuel to each of the cylinders that are activated (e.g., combusting fuel during a cycle of the engine with intake and exhaust valves opening and closing during a cycle of the cylinder that is active). Cylinders 1-4 may be selectively deactivated (e.g., not combusting fuel during a cycle of the engine with intake and exhaust valves held closed over an entire cycle of the cylinder being deactivated) to improve engine fuel economy when less than the engine's full torque capacity is requested. For example, cylinders 2 and 3 (e.g., a fixed pattern of deactivated cylinders) may be deactivated during a plurality of engine cycles (e.g., two revolutions for a four stroke engine). During a different engine cycle, a second fixed pattern cylinders 1 and 4 may be deactivated over a plurality of engine cycles. Further, other patterns of cylinders may be selectively deactivated based on vehicle operating conditions. Additionally, engine cylinders may be deactivated such that a fixed pattern of cylinders is not deactivated over a plurality of engine cycles. Rather, cylinders that are deactivated may change from one engine cycle to the next engine cycle. In this way, the deactivated engine cylinders may rotate or change from one engine cycle to the next engine cycle.

Engine 10 includes a single cylinder bank 250, which includes four cylinders 1-4. Cylinders of the single bank may be active or deactivated during a cycle of the engine. Each cylinder includes variable intake valve actuators 51 and variable exhaust valve actuators 53. An engine cylinder may be deactivated by its variable intake valve actuators 51 and variable exhaust valve actuators holding intake and exhaust valves of the cylinder closed during a cycle of the cylinder, while fuel injector 66 does not inject fuel to the cylinder during a cycle of the cylinder. An engine cylinder may be activated by its variable intake valve actuators 51 and variable exhaust valve actuators 53 opening and closing intake and exhaust valves of the cylinder during a cycle of the cylinder, while fuel injector 66 injects fuel to the cylinder during a cycle of the cylinder.

The system of FIGS. 1-2B provides for an engine system, comprising: an engine including one or more cylinder deactivating mechanisms; a controller including executable instructions stored in non-transitory memory to adjust an engine operating range that defines where engine cylinders may be deactivated in response to an actual total number of valve actuator state changes being greater than a first threshold, and deactivate engine cylinders according to the engine operating range. The engine system includes where the engine operating range is an engine speed and load range. The engine system includes where adjusting the engine operating range includes splitting the engine operating range into two operating ranges. The engine system includes where the first operating range of the two operating ranges is at a lower engine load than a second operating range of the two operating ranges.

In some examples, the engine system further comprises additional instructions to operate the engine with a fixed group of deactivated cylinders over a plurality of engine cycles in the second operating range. The engine system further comprises additional instructions to change which engine cylinders are in the fixed group of deactivated cylinders in response to the actual total number of valve actuator state changes.

Figure 3A:
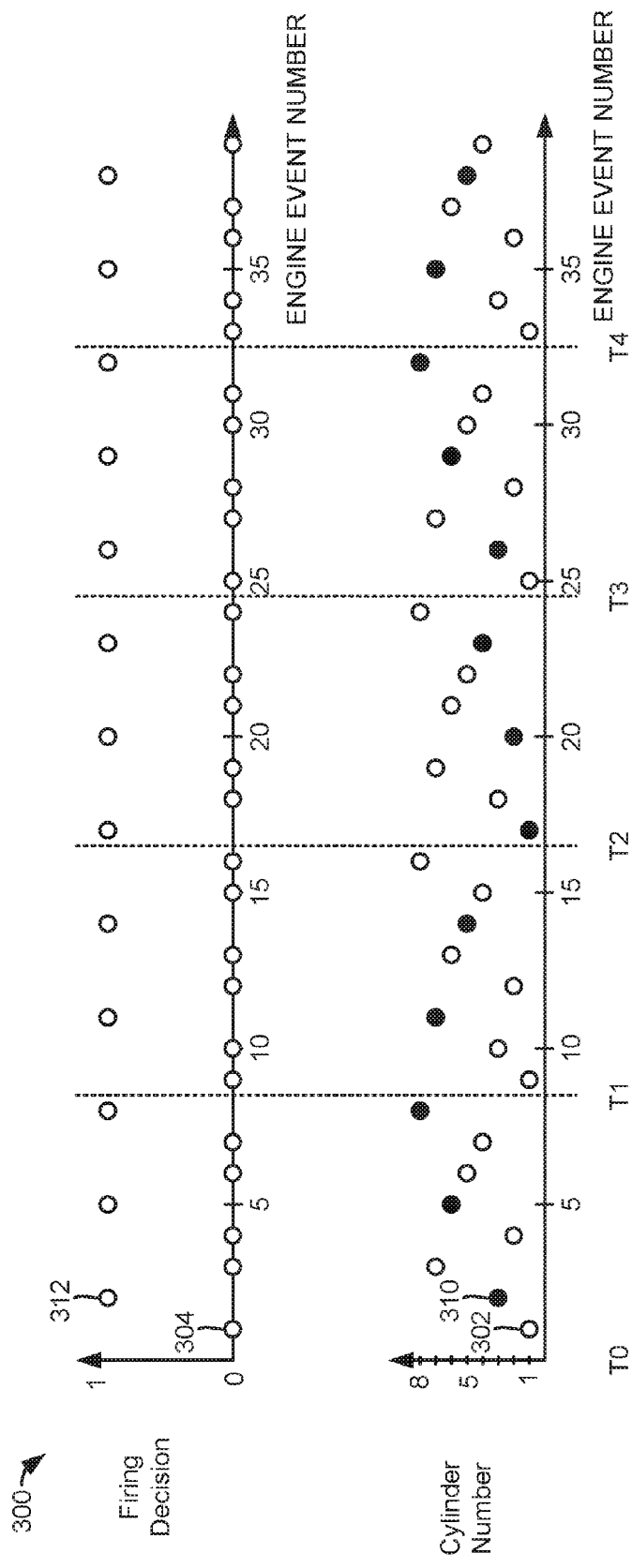
FIG. 3A is plot of a first example operating sequence.

Referring now to FIG. 3A, plots of an engine operating sequence are shown. The two plots are aligned in time and occur at the same time. The vertical dotted lines identified by labels T0-T4 separate engine cycles. The sequence may be provided by the system of FIGS. 1 and 2A including the method of FIG. 5 stored as executable instructions in non-transitory memory. The sequence of FIG. 3A is based on an eight cylinder four stroke engine having a firing order or order of combustion of 1, 3, 7, 2, 6, 5, 4, and 8. The engine cylinder firing fraction for this sequence is 0.333.

The first plot from the top of FIG. 3A is a plot of cylinder activation (e.g., firing with intake and exhaust valves opening and closing and fuel being injected during a cycle of the cylinder) or deactivation (e.g., not firing with intake and exhaust valves held closed and fuel not being injected during a cycle of the cylinder) decision for engine cylinders versus engine event number. An engine event may be a stroke of a cylinder occurring (e.g., intake, compression, power, exhaust), an intake or exhaust valve opening or closing time, injection of fuel, time of ignition of an air-fuel mixture in the cylinder, a position of a piston in the cylinder with respect to the crankshaft position, or other engine related event. The engine event number corresponds to a particular cylinder. For example, engine event number one may correspond to a compression stroke of cylinder number one. Engine event number two may correspond to a compression stroke of cylinder number three.

The decision to activate or deactivate a cylinder and open and close the cylinder's intake and exhaust valve and inject fuel may be made a predetermined number of engine events (e.g., one cylinder event, or alternatively, one cylinder cycle or eight cylinder events) before the cylinder is to be activated or deactivated to allow time to begin the process of opening and closing intake and exhaust valves of the cylinder being evaluated. For example, for an eight cylinder engine with a firing order of 1, 3, 7, 2, 6, 5, 4, 8, the decision to activate or deactivate cylinder number seven may be made during an intake or compression stroke of cylinder number seven one engine cycle before cylinder number seven is deactivated. Alternatively, the decision to activate or not activate a cylinder may be made a predetermined number of engine events or cylinder events before the selected cylinder is activated or deactivated. The cylinder on its compression stroke, at the time corresponding to the event number, is activated when the firing decision value indicated by circle is a value of one. The cylinder on its compression stroke, at the time corresponding to the event number, is not activated when the firing decision value indicated by circle is zero. The vertical axis represents the firing decision and the horizontal axis represents cylinder event number or actual total number of cylinder events.

The second plot from the top of FIG. 3A is a plot of cylinder numbers that correspond to the firing decisions shown in the first plot from the top of FIG. 3A. The vertical axis represents the cylinder number for the present cylinder being evaluated. The horizontal axis represents engine event number or actual total number of engine events. The solid filled circles represent an active cylinder with combustion during the cylinder's cycle. The circles that are not filled represent deactivated cylinders without combustion during the engine's cycle.

In this example, the first engine cycle shown begins at time T0. The first engine event corresponds to cylinder number one as indicated at 302. Cylinder number one does not fire as indicated by the unfilled circle at 302 and the firing decision at 304 being zero. The second engine event corresponds to cylinder number three as indicated at 310. Cylinder number three is active and it fires as indicated by the filled circle at 310 and the firing decision at 312 being one. Firing decisions for the remaining cylinders follow a similar convention.

It may be observed that the engine's cylinders are activated and fired three times for every nine compression strokes so that the engine follows the desired 0.333 engine cylinder firing fraction. Further, engine cycles begin and end at vertical markers T0, T1, T2, T3, and T4. For example, the first engine cycle is between time T0 and time T1. The second engine cycle is between time T1 and time T2. Different engine cylinders are deactivated from one engine cycle to the next so that a fixed pattern of deactivated cylinders is not present during adjacent engine cycles. The 0.333 engine cylinder firing fraction is a non-stationary or non-fixed pattern because the cylinders that are activated and deactivated change from engine cycle to engine cycle. All engine cylinders may fire over the course of one or more cylinder cycles for a non-stationary pattern when cylinders are deactivated.

Figure 3B:
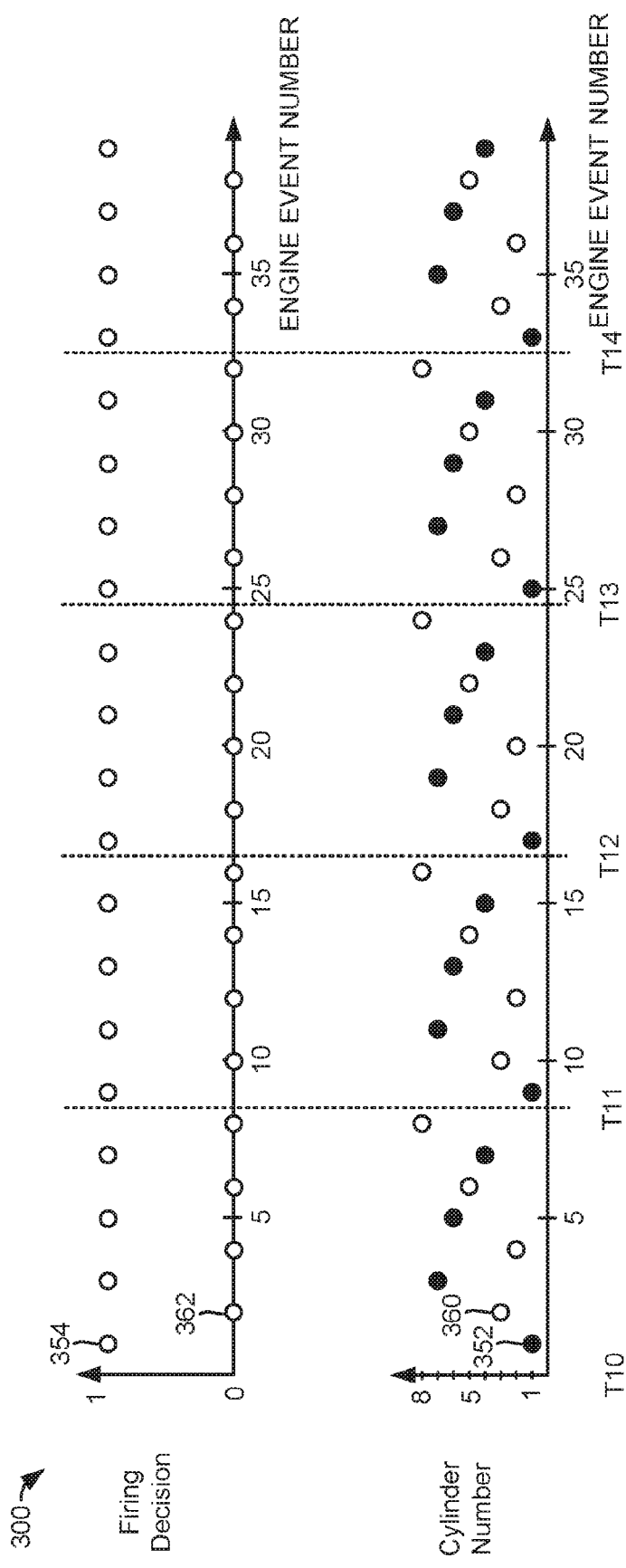
FIG. 3B is a plot of a second example operating sequence.

Referring now to FIG. 3B, plots of a second engine operating sequence are shown. The two plots are aligned in time and occur at the same time. The sequence may be provided by the system of FIGS. 1 and 2A including the method of FIG. 5 stored as executable instructions in non-transitory memory. The sequence of FIG. 3B is based on an eight cylinder four stroke engine having a firing order or order of combustion of 1, 3, 7, 2, 6, 5, 4, 8. The engine cylinder firing fraction for this sequence is 0.5.

The first plot from the top of FIG. 3B is a plot of cylinder activation or deactivation decision for engine cylinders versus engine event number. The vertical axis represents the firing decision and the horizontal axis represents engine event number or actual total number of engine events.

The second from the top of FIG. 3B is a plot of cylinder numbers that correspond to the firing decisions shown in the first plot from the top of FIG. 3B. The vertical axis represents the cylinder number for the engine event being evaluated. The horizontal axis represents engine event number or actual total number of engine events. The solid filled circles represent an active cylinder with combustion during the engine's cycle. The circles that are not filled represent deactivated cylinders without combustion during the engine's cycle.

In this example, the first engine event corresponds to cylinder number one as indicated at 352. Cylinder number one fires as indicated by the filled circle at 352 and the firing decision at 354 being one. The second engine event corresponds to cylinder number three as indicated at 360. Cylinder number three is deactivated and it does not fire as indicated by the unfilled circle at 360 and the firing decision at 362 being zero. Firing decisions for the remaining cylinders follow a similar convention.

It may be observed that the engine's cylinders are activated and fired five times for every ten compression strokes so that the engine follows the desired 0.5 engine cylinder firing fraction. The 0.5 engine cylinder firing fraction is a fixed or stationary pattern because the cylinders that are activated and deactivated do not change from engine cycle to engine cycle. For example, cylinders 1, 6, 7, and 4 always fire in an engine cycle while cylinders 2, 3, 5, and 8 do not fire at any time during the sequence. The vertical markers at time T10-T14 represent the beginning and endings of engine cycles. For example, the first engine cycle is between time T10 and time T11. The second engine cycle is between time T11 and time T12.

Figure 4A:
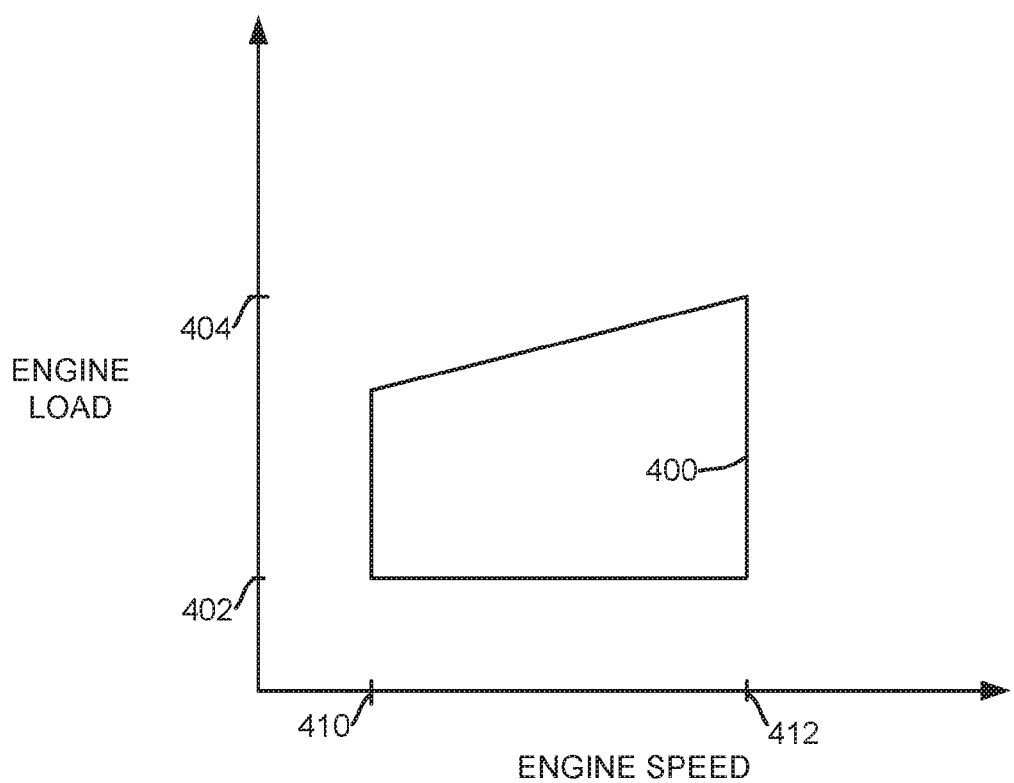
FIGS. 4A and 4B are plots of example engine cylinder deactivation ranges.
Figure 5:
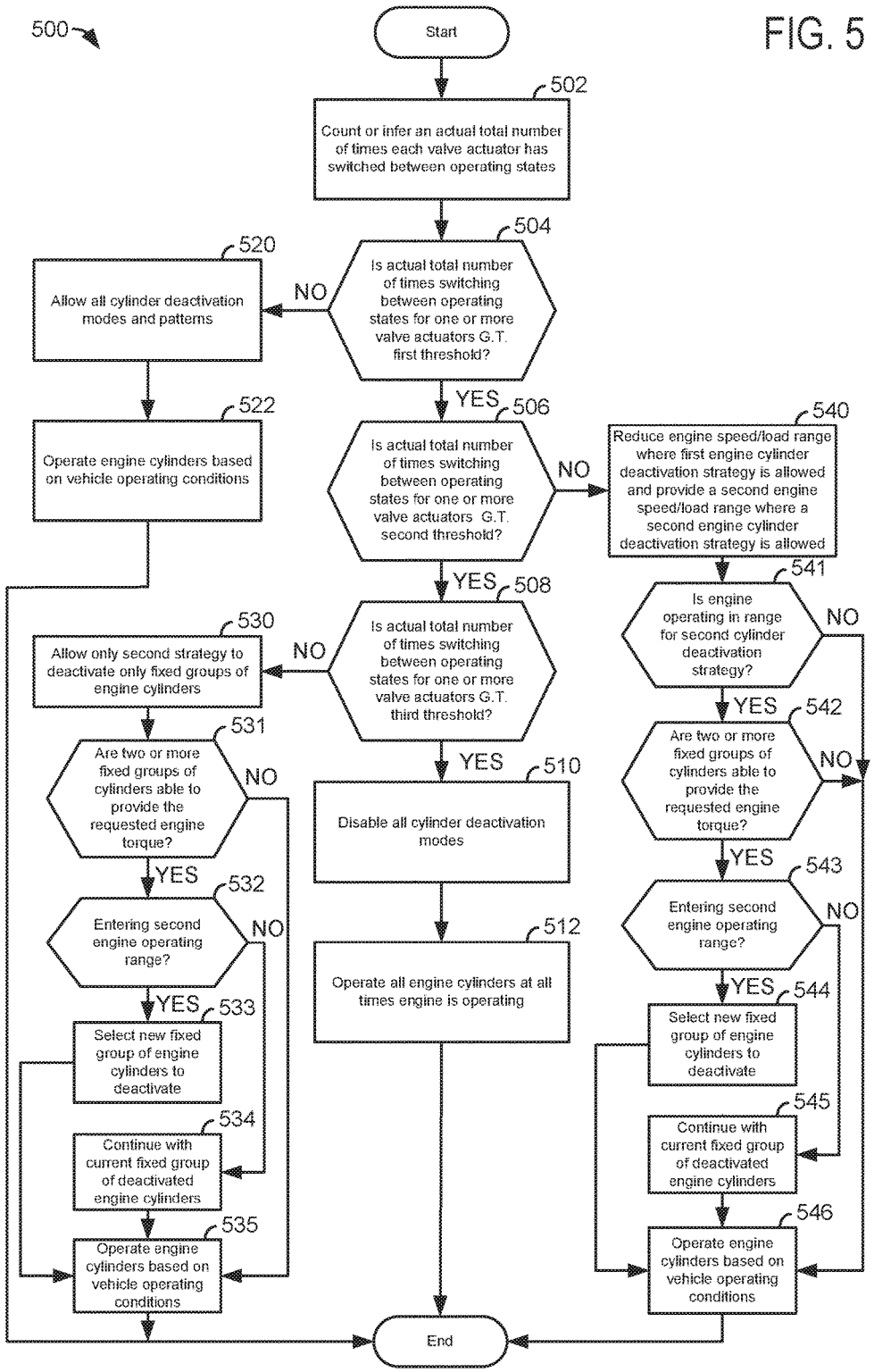
FIG. 5 shows a flow chart of an example method for operating an engine.

Referring now to FIG. 4A, an example engine cylinder deactivation operating range is shown. The vertical axis represents engine load and engine load increases in the direction of the vertical axis arrow. The horizontal axis represents engine speed and engine speed increases in the direction of the horizontal axis arrow.

The area bounded by solid line 400 is an engine operating range where one or more engine cylinders may be deactivated to conserve fuel. The engine cylinders may be deactivated (e.g., ceasing fuel to deactivated cylinders and holding intake and exhaust valves of deactivated cylinders closed over an entire engine cycle) in the area surrounded by solid line 400 via deactivating the cylinders such that different engine cylinders are deactivated for each engine cycle and so that cylinders deactivated during one engine cycle are not the same cylinders deactivated during a next or adjacent engine cycle. For example, for a four cylinder four cycle engine with a firing order of 1, 3, 4, 2, cylinders 1 and 4 may be deactivated during a first engine cycle and only cylinder number 1 may be deactivated during a next engine cycle. FIG. 3A also shows a cylinder deactivation example for this engine operating range. Thus, the group of deactivated cylinders changes from one engine cycle to the next engine cycle. All engine cylinders are active (e.g., fuel flowing to active cylinders and combusting air and fuel in the active cylinders while intake and exhaust valves open and close during a cycle of the engine) in the area surrounding solid line 400.

In this example, solid line 400 shows that the engine cylinder deactivation operating range is trapezoidal in shape, but the engine cylinder deactivation range may be shaped differently in other examples. The engine cylinder deactivation range is defined by engine load (e.g., the vertical axis) and engine speed (e.g., the horizontal axis). The engine cylinder deactivation range extends from an engine load at 402 to an engine load at 404 and from engine speed at 410 to engine speed at 412. The engine cylinder deactivation range bounded by solid line 400 may be the basis for cylinder deactivation when the actual total number of valve actuator state changes is less than a first threshold amount.

Figure 4B:
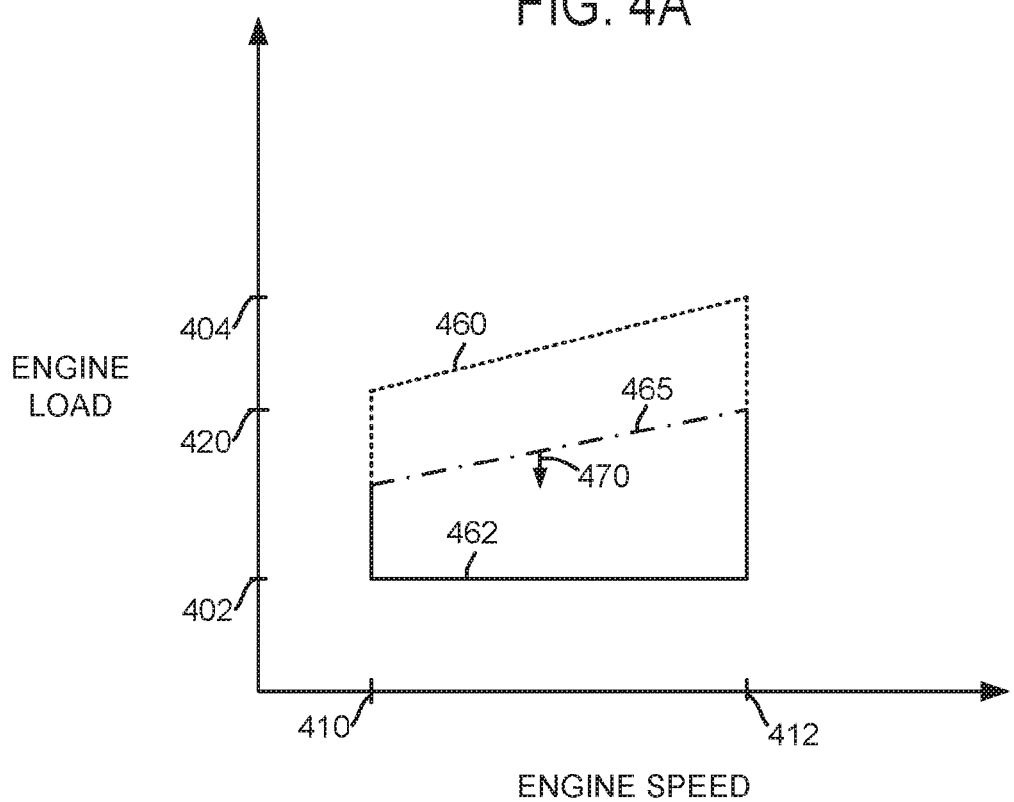

Referring now to FIG. 4B, a second example of engine cylinder deactivation operating range is shown. The vertical axis represents engine load and engine load increases in the direction of the vertical axis arrow. The horizontal axis represents engine speed and engine speed increases in the direction of the horizontal axis arrow. The engine cylinder deactivation range shown in FIG. 4B is a same size as the cylinder deactivation range shown in FIG. 4A, but the range shown in FIG. 4B is divided into two parts or sections.

The area or range bounded by solid line 462 and dot-dash line 465 is an engine operating range where one or more engine cylinders may be deactivated to conserve fuel. The engine cylinders may be deactivated in the area surrounded by solid line 462 and dot-dash line 465 via deactivating the cylinders such that different engine cylinders are deactivated for each engine cycle and so that cylinders deactivated during one engine cycle are not the same cylinders deactivated during a next or adjacent engine cycle when engine speed, load, and temperature are substantially constant (e.g., changing by less than ±3%). Thus, engine cylinders may be deactivated in the same ways as described for range 400 of FIG. 4A. Consequently, the group of deactivated cylinders may change from one engine cycle to the next engine cycle when engine cylinders are deactivated in this engine operating range. FIG. 3A shows a cylinder deactivation sequence example for this engine operating range.

The area or range bounded by dashed line 460 and dot-dash line 465 is an engine operating range where one or more engine cylinders may also be deactivated to conserve fuel. The engine cylinders may be deactivated in the area surrounded by dashed line 460 and dot-dash line 465 via deactivating the cylinders such that the same engine cylinders are deactivated for each engine cycle and so that cylinders deactivated during one engine cycle are the same cylinders deactivated during a next or adjacent engine cycle when engine speed, load, and temperature are substantially constant (e.g., changing by less than ±3%). The cylinder deactivation pattern is fixed as shown in the example of FIG. 3B.

Thus, engine cylinders may be deactivated via a first engine cylinder deactivation strategy (e.g., different engine cylinders are deactivated for each engine cycle so that engine cylinders deactivated during one engine cycle are not the same cylinders deactivated during a next or adjacent engine cycle when the engine is operated at constant speed, engine load, and engine temperature) in a first engine operating range surrounded by solid line 462 and dot-dash line 465. The engine cylinders may be deactivated via a second strategy (e.g., the same engine cylinders are deactivated for each engine cycle so that engine cylinders deactivated during one engine cycle are the same cylinders deactivated during a next or adjacent engine cycle) in the engine second operating range surrounded by dashed line 460 and dot-dash line 465.

If the actual number of valve actuator state changes exceeds a threshold, the second range may be expanded to include the area of the first range and the first range may be eliminated such that the engine cylinders may be deactivated only via the second strategy.

All engine cylinders are active (e.g., fuel flowing to active cylinders and combusting air and fuel in the active cylinders while intake and exhaust valves open and close during a cycle of the engine) in the area surrounding solid line 462 and dashed line 460.

In this example, solid line 462 and dashed line 460 show that the engine cylinder deactivation operating range is trapezoidal in shape, but the engine cylinder deactivation range may be shaped differently in other examples. The engine cylinder deactivation range is defined by engine load (e.g., the vertical axis) and engine speed (e.g., the horizontal axis). The engine cylinder deactivation range extends from an engine load at 402 to an engine load at 404 and from engine speed at 410 to engine speed at 412. The engine cylinder deactivation range bounded by solid line 400 may be the basis for cylinder deactivation when the actual total number of valve actuator state changes is less than a first threshold amount.

It should be noted that the engine operating range surrounded by dashed line 460 and dot-dash line 465 may be increased via extending the range in the direction of lower engine loads as shown by arrow 470 (e.g., moving dot-dash line 465) in response to the actual total number of valve actuator state changes increasing. At the same time, the range surrounded by solid line 462 and dot-dashed line 465 may be decreased such that the area surrounded by solid line 462 and dashed line 460 remains the same size. By increasing the area bounded by dashed line 460 and dot-dashed line 465, the rate at which the actual total number of valve actuator state change occurs may be decreased since cylinders are deactivated according to a fixed pattern during a plurality of engine cycles in the range bounded by dashed line 460 and dot-dashed line 465. When cylinders are deactivated according to a fixed pattern where deactivated cylinders are not changing every engine cycle, the rate of change of the actual total number of valve actuator state changes may be reduced.

Referring now to FIG. 5, a flow chart describing different strategies for deactivating engine cylinders in response to an actual total number of valve actuator state changes is shown. The method of FIG. 5 may be incorporated into and may cooperate with the system of FIGS. 1-2B. Further, at least portions of the method of FIG. 5 may be incorporated as executable instructions stored in non-transitory memory while other portions of the method may be performed via a controller transforming operating states of devices and actuators in the physical world.

At 502, method 500 counts or infers an actual total number of valve actuator state changes (e.g., changing from a state where the valve actuator operates a valve such that the valve opens and closes during an engine cycle to a state where the valve actuator does not operate the valve such that the valve stays closed during an entire engine cycle or vice-versa). In one example, the actual total number of valve actuator state changes may be tracked in memory by incrementing a value stored in memory each time a state change of the valve actuator is commanded. In other examples, a position of the valve actuator may be indicative of a valve actuator state change and a sensor may indicate such state changes. A value stored in memory may be incremented each time a valve actuator state change is indicated by the sensor. Alternatively, the actual total number of valve actuator state changes may be inferred by tracking an amount of time the engine operates in a specific operating range. The amount of time may be used to index a table or function of empirically determined values that represent the actual total number of valve actuator state changes. Output from the table or function may be added to an accumulator that totals the number of valve actuator state changes to determine the total number of valve actuator state changes. Method 500 proceeds to 504 after determining the actual total number of valve actuator state changes.

At 504, method 500 judges if the actual total number of valve actuator state changes for one or more valve actuators is greater than a first threshold amount. If so, the answer is yes and method 500 proceeds to 506. Otherwise, the answer is no and method 500 proceeds to 520. The first threshold amount may be based on empirically determined valve actuator degradation data. For example, the first threshold value may be based on an actual total number of valve actuator state changes that correspond to eighty percent of an actual total number of valve actuator state changes where valve actuator degradation may be expected.

At 506, method 500 judges if the actual total number of valve actuator state changes for one or more valve actuators is greater than a second threshold amount. If so, the answer is yes and method 500 proceeds to 508. Otherwise, the answer is no and method 500 proceeds to 540. The second threshold amount may be based on empirically determined valve actuator degradation data. For example, the second threshold value may be based on an actual total number of valve actuator state changes that correspond to ninety percent of an actual total number of valve actuator state changes where valve actuator degradation may be expected.

At 508, method 500 judges if the actual total number of valve actuator state changes for one or more valve actuators is greater than a third threshold amount. If so, the answer is yes and method 500 proceeds to 510. Otherwise, the answer is no and method 500 proceeds to 530. The third threshold amount may be based on empirically determined valve actuator degradation data. For example, the third threshold value may be based on an actual total number of valve actuator state changes that correspond to ninety five percent of an actual total number of valve actuator state changes where valve actuator degradation may be expected.

At 510, method 500 disables all engine cylinder deactivation modes such that the engine operates with all engine cylinders when the engine is operating (e.g., combusting air and fuel). The engine cylinder deactivation modes are deactivated so that the engine may provide torque to its full capacity and so that the possibility of valve actuator degradation may be reduced. Method 500 proceeds to 512.

At 512, method 500 operates the engine with all of the engine's cylinders being active (e.g., combusting air and fuel) when engine torque is requested. If a small amount of engine torque is requested, the engine may be throttled to provide the requested amount of torque. Method 500 proceeds to exit.

At 520, method 500 allows a first cylinder deactivation strategy that allows different engine cylinders to be deactivated for each engine cycle so that engine cylinders deactivated during one engine cycle are not the same cylinders deactivated during a next or adjacent engine cycle when the engine is operated at substantially constant (e.g., changing by less than ±3 percent over a predetermined amount of time) speed, substantially constant engine load, and substantially constant engine temperature. FIG. 3A shows one example of deactivating cylinders according to a first strategy as described. Further, the number of active cylinders (e.g., cylinders combusting air and fuel with exhaust and intake valves that open and close during an engine cycle) may change from engine event to engine event when the engine torque request and/or engine speed changes. The first cylinder deactivation strategy may be applied to deactivate engine cylinders in an engine operating range as indicated by solid line 400 in FIG. 4A.

The first engine cylinder deactivation strategy also selects which particular cylinders are activated and deactivated based on the engine speed, engine load, a desired cylinder firing fraction, and other conditions. For example, the first engine cylinder deactivation strategy may select cylinders to be deactivated as described in U.S. Pat. No. 7,577,511, which is hereby fully incorporated by reference for all intents and purposes. Alternatively, a different engine cylinder deactivation strategy may be used to select which engine cylinders are activated and deactivated. Method 500 proceeds to 522.

At 522, method 500 operates engine cylinders according to the first strategy when the engine is operating in an engine speed/load range where cylinder deactivation is allowed (e.g., the range inside of solid line 400 of FIG. 4A). Cylinders may be deactivated based on requested engine torque, engine speed, and engine temperature. A cylinder may be deactivated by holding intake and exhaust valves of the cylinder closed over an entire engine cycle and by ceasing to deliver fuel to the deactivated cylinder. If the engine is operating in a range outside of the range where engine cylinder deactivation is permitted, the engine is operated with all engine cylinders being activated. Method 500 proceeds to exit.

At 540, method 500 reduces a size of the first engine operating range (e.g., an engine speed and load range defined by the area surrounded by dot-dash line 465 and solid line 462 in FIG. 4B) where the first engine cylinder deactivation strategy is the basis for deactivating cylinders. Further, method 500 provides a second engine operating range where a second engine cylinder deactivation strategy is the basis for deactivating cylinders. The second engine operating range is at higher engine loads than the first engine operating range (e.g., the area surrounded by dashed line 460 and dot-dash line 465 in FIG. 4B).

The first engine cylinder deactivation strategy allows different engine cylinders to be deactivated for each engine cycle so that engine cylinders deactivated during one engine cycle are not the same cylinders deactivated during a next or adjacent engine cycle when the engine is operated at constant speed, engine load, and engine temperature. The engine cylinder deactivation strategy shown in FIG. 3A is one example of the first engine cylinder deactivation strategy. In another example, where the engine is an eight cylinder four stroke engine with a firing order of 1, 3, 7, 2, 6, 5, 4, and 8, the engine may operate by firing cylinders 1, 7, 6, 4, and 8 while all other remaining cylinders are deactivated during a first engine cycle, by firing cylinders 1, 3, 7, 6, and 4 while all other remaining cylinders are deactivated during a next engine cycle, by firing cylinders 1, 7, 2, 5, and 4 while all other remaining cylinders are deactivated during a next engine cycle, by firing cylinders 3, 2, 5, 4, and 8 while all other remaining cylinders are deactivated during a next engine cycle, and so on. By reducing the size of the range where the first engine cylinder deactivation strategy may be applied, the benefit of using the first engine cylinder deactivation strategy is maintained where the benefit (e.g., reduced fuel consumption) is largest.

The second engine cylinder deactivation strategy allows only fixed groups of engine cylinders to be deactivated over a plurality of engine cycles such that engine cylinders deactivated during one engine cycle are the same cylinders that are deactivated during a next or adjacent engine cycle when the engine is operated at a substantially constant (e.g., changing by less than ±3 percent over a predetermined amount of time) engine speed, substantially constant (e.g., changing by less than ±3 percent over a predetermined amount of time) engine load, and substantially constant (e.g., changing by less than ±3 percent over a predetermined amount of time) engine temperature. The engine cylinder deactivation strategy shown in FIG. 3B is one example of the second engine cylinder deactivation strategy. In another example, where the engine is an eight cylinder four stroke engine with a firing order of 1, 3, 7, 2, 6, 5, 4, and 8, the engine may operate by firing a fixed group of cylinders (e.g., 2, 3, 5, and 8) while all other remaining cylinders are deactivated during a first engine cycle and a plurality of subsequent engine cycles. By providing an engine operating range where the second engine cylinder deactivation strategy may be applied, at least some benefit (e.g., reduced fuel consumption) may be maintained while the rate at which engine valve actuators change state may be reduced, thereby extending the amount of time cylinder deactivation may be available. Method 400 proceeds to 541.

At 541, method 500 judges if the engine is operating in the second engine operating range where the second cylinder deactivation strategy is the basis for deactivating engine cylinders. Method 500 may judge that the engine is in the second engine operating range if the engine speed and engine load are within the second engine operating range. If so, the answer is yes and method 500 proceeds to 542. Otherwise, the answer is no and method 500 proceeds to 546.

At 542, method 500 judges if two or more groups with fixed deactivated cylinders may provide the presently requested engine torque. For example, for an eight cylinder four stroke engine with a firing order of 1, 3, 7, 2, 6, 5, 4, and 8, where an engine torque request may be met with four active cylinders while four cylinders of an eight cylinder engine are deactivated, the answer is yes if the engine torque may be provided while a first fixed group of cylinders 2, 3, 5, and 8 is deactivated in a first engine cylinder deactivation mode and if the engine torque may be provided while a second fixed group of cylinders 1, 4, 6, and 7 is deactivated in a second engine cylinder deactivation mode, the first engine cylinder deactivation mode and the second engine cylinder deactivation mode not active at a same time. If the requested engine torque may be provided by two or more groups with fixed deactivated cylinders, the answer is yes and method 500 proceeds to 543. If the requested engine torque may not be provided by two or more groups of fixed deactivated cylinders (e.g., the requested engine torque may be provided by deactivating only cylinders 2, 3, 5, and 8), the answer is no and method 500 proceeds to 546.

At 543, method 500 judges if the engine is entering into the second engine operating range described at 540. Method 500 may judge that the engine is entering the second engine operating range when engine speed and engine load change from being in the area outside of the second engine operating range to being within the area defined by the second engine operating range. If method 500 judges that the engine is entering the second engine operating range, the answer is yes and method 500 proceeds to 544. Otherwise, the answer is no and method 500 proceeds to 545.

At 544, method 500 selects a new fixed group of engine cylinders to deactivate while providing the requested engine torque. For example, if the engine has capability of providing the desired engine torque with cylinders 2, 3, 5, and 8 deactivated or with 1, 4, 6, and 7 cylinders deactivated, and the engine operated with cylinders 2, 3, 5, and 8 deactivated a last time the engine operated in the second engine operating range before exiting the second engine operating range, the engine selects to deactivated cylinders 1, 4, 6, and 7. In this way, the actual total number of valve actuator state changes may be distributed between the valve actuators of the various engine cylinders. If the engine may provide the requested engine torque via three or more different fixed groups of cylinders, method 500 may select the fixed group of cylinders having a lower number of valve actuator state changes to be the group of engine cylinders to be deactivated. Thus, the actual total number of valve actuator state changes may be equalized between the different cylinders. Method 500 proceeds to 546 after it is determined which fixed group of engine cylinders is to be deactivated.

At 545, method 500 continues to operate the engine with the fixed group of cylinders that were deactivated when the engine first entered the second operating range. Thus, once the engine enters the second engine operating range and the fixed group of cylinders is deactivated, the engine continues to operate with the same group of deactivated cylinders until the engine exits the second operating range. Method 500 proceeds to 546.

At 546, method 500 operates engine cylinders according to the first strategy when the engine is operating in the first engine operating range and engine cylinders are operated according to the second strategy when the engine is operating in the second operating range as described at 540. Further, if the engine is operating in the second engine operating range, the fixed group of cylinders deactivated is the group described at 544, or method 500 continues to deactivating the cylinders as described at 545. Cylinders may be deactivated based on requested engine torque, engine speed, and engine temperature. If the engine is operating in a range outside of the range where engine cylinder deactivation is permitted, the engine is operated with all engine cylinders being activated. Method 500 proceeds to exit.

At 530, method 500 allows only the second engine cylinder deactivation strategy to deactivate fixed groups of engine cylinders in the second operating range. The first engine operating range is eliminated and the second engine operating range is expanded to encompass the entire engine operating range where cylinders may be deactivated (e.g., the area surrounded by solid line 462 and dashed line 460 shown in FIG. 4B).

The second engine cylinder deactivation strategy allows only fixed groups of engine cylinders to be deactivated over a plurality of engine cycles such that engine cylinders deactivated during one engine cycle are the same cylinders that are deactivated during a next or adjacent engine cycle when the engine is operated at a substantially constant (e.g., changing by less than ±3 percent over a predetermined amount of time) engine speed, substantially constant (e.g., changing by less than ±3 percent over a predetermined amount of time) engine load, and substantially constant (e.g., changing by less than ±3 percent over a predetermined amount of time) engine temperature. The engine cylinder deactivation strategy shown in FIG. 3B is one example of the second engine cylinder deactivation strategy. In another example, where the engine is an eight cylinder four stroke engine with a firing order of 1, 3, 7, 2, 6, 5, 4, and 8, the engine may operate by firing a fixed group of cylinders (e.g., 2, 3, 5, and 8) while all other remaining cylinders are deactivated during a first engine cycle and a plurality of subsequent engine cycles. By providing an engine operating range where the second engine cylinder deactivation strategy may be applied, at least some benefit (e.g., reduced fuel consumption) may be maintained while the rate at which engine valve actuators change state may be reduced, thereby extending the amount of time cylinder deactivation may be available.

The second engine cylinder deactivation strategy also selects which cylinders are activated and deactivated based on the engine speed and engine load. For example, a plurality of engine cylinder modes may be stored in memory and cylinder modes that provide insufficient torque to meet the requested engine torque are eliminated from the available engine cylinder modes. The engine may be operated with the remaining available engine cylinder modes. The engine cylinder modes may include patterns of activated engine cylinders and deactivated cylinders with which the engine may operate. For example, the engine operating mode or cylinder pattern for an eight cylinder engine may have cylinders 1, 4, 6, and 7 active with cylinders 2, 3, 5, and 8 deactivated. In another example, the engine operating mode or cylinder pattern for the eight cylinder engine may have cylinders 2, 3, 5, and 8 active with cylinders 1, 4, 6, and 7 deactivated. Method 500 proceeds to 531.

At 531, method 500 judges if two or more groups with fixed deactivated cylinders may provide the presently requested engine torque. For example, for an eight cylinder four stroke engine with a firing order of 1, 3, 7, 2, 6, 5, 4, and 8, where an engine torque request may be met with four active cylinders while four cylinders of an eight cylinder engine are deactivated, the answer is yes if the engine torque may be provided while a first fixed group of cylinders 2, 3, 5, and 8 is deactivated in a first engine cylinder deactivation mode and if the engine torque may be provided while a second fixed group of cylinders 1, 4, 6, and 7 is deactivated in a second engine cylinder deactivation mode, the first engine cylinder deactivation mode and the second engine cylinder deactivation mode not active at a same time. If the requested engine torque may be provided by two or more groups with fixed deactivated cylinders, the answer is yes and method 500 proceeds to 532. If the requested engine torque may not be provided by two or more groups of fixed deactivated cylinders (e.g., the requested engine torque may be provided by deactivating only cylinders 2, 3, 5, and 8), the answer is no and method 500 proceeds to 534.

At 532, method 500 judges if the engine is entering into the second engine operating range described at 530. Method 500 may judge that the engine is entering the second engine operating range when engine speed and engine load change from being in the area outside of the second engine operating range to being within the area defined by the second engine operating range. If method 500 judges that the engine is entering the second engine operating range, the answer is yes and method 500 proceeds to 533. Otherwise, the answer is no and method 500 proceeds to 534.

At 533, method 500 selects a new fixed group of engine cylinders to deactivate while providing the requested engine torque. For example, if the engine has capability of providing the desired engine torque with cylinders 2, 3, 5, and 8 deactivated or with 1, 4, 6, and 7 cylinders deactivated, and the engine operated with cylinders 2, 3, 5, and 8 deactivated a last time the engine operated in the second engine operating range before exiting the second engine operating range, the engine selects to deactivated cylinders 1, 4, 6, and 7. In this way, the actual total number of valve actuator state changes may be distributed between the valve actuators of the various engine cylinders. If the engine may provide the requested engine torque via three or more different fixed groups of cylinders, method 500 may select the fixed group of cylinders having a lower number of valve actuator state changes to be the group of engine cylinders to be deactivated. Thus, the actual total number of valve actuator state changes may be equalized between the different cylinders. Method 500 proceeds to 535 after it is determined which fixed group of engine cylinders is to be deactivated.

At 534, method 500 continues to operate the engine with the fixed group of cylinders that were deactivated when the engine first entered the second operating range. Thus, once the engine enters the second engine operating range and the fixed group of cylinders is deactivated, the engine continues to operate with the same group of deactivated cylinders until the engine exits the second operating range. Method 500 proceeds to 546.

At 535, method 500 operates engine cylinders according to the second strategy when the engine is operating in the second operating range as described at 540. Further, if the engine is operating in the second engine operating range, the fixed group of cylinders deactivated is the group described at 544, or method 500 continues to deactivating the cylinders as described at 545. Cylinders may be deactivated based on requested engine torque, engine speed, and engine temperature. If the engine is operating in a range outside of the range where engine cylinder deactivation is permitted, the engine is operated with all engine cylinders being activated. Method 500 proceeds to exit.

Thus, the method of FIG. 5 provides for an engine control method, comprising: deactivating engine cylinders via a controller according to a first cylinder deactivation strategy in response to an actual total number of valve actuator state changes being less than a first threshold; and deactivating the engine cylinders via the controller according to a second cylinder deactivation strategy in response to an actual total number of valve actuator state changes being greater than a second threshold. The method includes where the first cylinder deactivation strategy deactivates a first engine cylinder and activates a second engine cylinder during a first engine cycle while the engine operates at a substantially constant engine speed, a substantially constant load, and a substantially constant temperature, and where the first cylinder deactivation strategy activates the first cylinder and deactivates a second engine cylinder during a second engine cycle while the engine operates at the substantially constant engine speed, a substantially constant load, and a substantially constant temperature.

In some examples, the method includes where the second cylinder deactivation strategy deactivates a first group of engine cylinders during a first engine cycle while the engine operates at a substantially constant engine speed, a substantially constant load, and a substantially constant temperature, and where the second cylinder deactivation strategy deactivates the first group of engine cylinders during a second engine cycle while the engine operates at the substantially constant engine speed, a substantially constant load, and a substantially constant temperature. The method further comprises deactivating the engine cylinders via the controller according to the second cylinder deactivation strategy and the first cylinder deactivation strategy in response to an actual total number of valve actuator state changes being greater than the first threshold and less than the second threshold. The method includes where the first group of cylinders is a fixed group of cylinders. The method also include where the actual total number of valve actuator state changes is inferred. The method further comprises deactivating cylinder deactivation in response to the actual total number of valve actuator state changes being greater than a third threshold.

The method of FIG. 5 also includes an engine control method, comprising: changing which cylinders of an engine are deactivated over a plurality of engine cycles while an engine operates at a substantially constant temperature and a substantially constant engine speed and load via a controller in response to an actual total number of valve actuator state changes being less than a first threshold; and deactivating a fixed group of engine cylinders while the engine operates at the substantially constant temperature and the substantially constant engine speed and loads via the controller in response to the actual total number of valve actuator state changes being greater than the first threshold. The method includes where engine cylinders are deactivated via ceasing to supply fuel to deactivated cylinders and holding intake and exhaust valves of deactivated cylinders closed for at least one cylinder cycle.

In some examples, the method further comprises changing which engine cylinders are included in the fixed group of engine cylinders in response to the actual total number of valve actuator state changes. The method further comprises deactivating cylinder deactivation in response to the actual total number of valve actuator state changes being greater than a third threshold. The method includes where changing which cylinders of the engine are deactivated includes deactivating a first cylinder during a first engine cycle and activating the first cylinder during a second engine cycle. The method includes where a valve actuator state change includes transitioning from a state where the valve actuator opens and closes a valve during a cylinder cycle to a state where the valve actuator holds the valve closed over the cylinder cycle. The method includes where changing which cylinders of the engine are deactivated over the plurality of engine cycles includes not deactivating a fixed group of engine cylinders over the plurality of engine cycles.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine control method, comprising:
deactivating engine cylinders via a controller according to a first cylinder deactivation strategy in response to an actual total number of valve actuator state changes being less than a first threshold; and
deactivating the engine cylinders via the controller according to a second cylinder deactivation strategy in response to an actual total number of valve actuator state changes being greater than a second threshold.

2. The method of claim 1, where the first cylinder deactivation strategy deactivates a first engine cylinder and activates a second engine cylinder during a first engine cycle while the engine operates at a substantially constant engine speed, a substantially constant load, and a substantially constant temperature, and where the first cylinder deactivation strategy activates the first cylinder and deactivates the second engine cylinder during a second engine cycle while the engine operates at the substantially constant engine speed, a substantially constant load, and a substantially constant temperature.

3. The method of claim 2, where the second cylinder deactivation strategy deactivates a first group of engine cylinders during a first engine cycle while the engine operates at a substantially constant engine speed, a substantially constant load, and a substantially constant temperature, and where the second cylinder deactivation strategy deactivates the first group of engine cylinders during a second engine cycle while the engine operates at the substantially constant engine speed, a substantially constant load, and a substantially constant temperature.

4. The method of claim 3, further comprising deactivating the engine cylinders via the controller according to the second cylinder deactivation strategy and the first cylinder deactivation strategy in response to an actual total number of valve actuator state changes being greater than the first threshold and less than the second threshold.

5. The method of claim 3, where the first group of cylinders is a fixed group of cylinders.

6. The method of claim 1, where the actual total number of valve actuator state changes is inferred.

7. The method of claim 1, further comprising disabling cylinder deactivation in response to the actual total number of valve actuator state changes being greater than a third threshold.

8. An engine control method, comprising:
changing which cylinders of an engine are deactivated over a plurality of engine cycles while an engine operates at a substantially constant temperature and a substantially constant engine speed and load via a controller in response to an actual total number of valve actuator state changes being less than a first threshold; and
deactivating a fixed group of engine cylinders while the engine operates at the substantially constant temperature and the substantially constant engine speed and loads via the controller in response to the actual total number of valve actuator state changes being greater than the first threshold.

9. The method of claim 8, where engine cylinders are deactivated via ceasing to supply fuel to deactivated cylinders and holding intake and exhaust valves of deactivated cylinders closed for at least one cylinder cycle.

10. The method of claim 8, further comprising changing which engine cylinders are included in the fixed group of engine cylinders in response to the actual total number of valve actuator state changes.

11. The method of claim 8, further comprising disabling cylinder deactivation in response to the actual total number of valve actuator state changes being greater than a third threshold.

12. The method of claim 8, where changing which cylinders of the engine are deactivated includes deactivating a first cylinder during a first engine cycle and activating the first cylinder during a second engine cycle.

13. The method of claim 8, where a valve actuator state change includes transitioning from a state where the valve actuator opens and closes a valve during a cylinder cycle to a state where the valve actuator holds the valve closed over the cylinder cycle.

14. The method of claim 8, where changing which cylinders of the engine are deactivated over the plurality of engine cycles includes not deactivating a fixed group of engine cylinders over the plurality of engine cycles.

15. An engine system, comprising:
an engine including one or more cylinder deactivating mechanisms;

a controller including executable instructions stored in non-transitory memory to adjust an engine operating range that defines where engine cylinders may be deactivated in response to an actual total number of valve actuator state changes being greater than a first threshold, and deactivate engine cylinders according to the engine operating range.

16. The engine system of claim 15, where the engine operating range is an engine speed and load range.

17. The engine system of claim 15, where adjusting the engine operating range includes dividing the engine operating range into two operating ranges.

18. The engine system of claim 17, where the first operating range of the two operating ranges is at a lower engine load than a second operating range of the two operating ranges.

19. The engine system of claim 18, further comprising additional instructions to operate the engine with a fixed group of deactivated cylinders over a plurality of engine cycles in the second operating range.

20. The engine system of claim 15, further comprising additional instructions to change which engine cylinders are in the fixed group of deactivated cylinders in response to the actual total number of valve actuator state changes.

* * * * *